F. DAVIS.
AUTOMOBILE LIFTING FRAME.
APPLICATION FILED JULY 5, 1921.
1,432,159.
Patented Oct. 17, 1922.
3 SHEETS—SHEET 1.
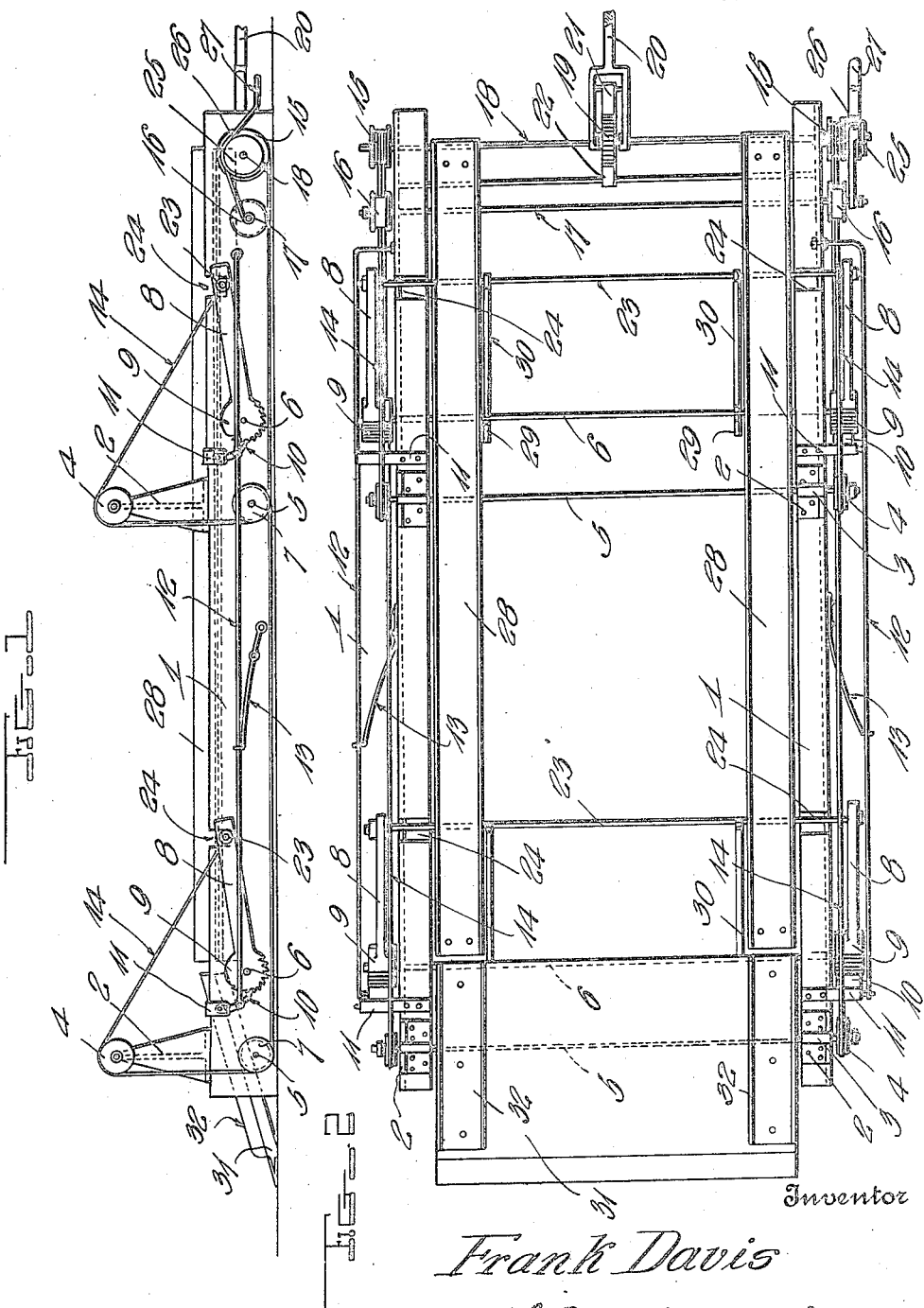
Inventor
Frank Davis
By H. B. Willson
Attorneys

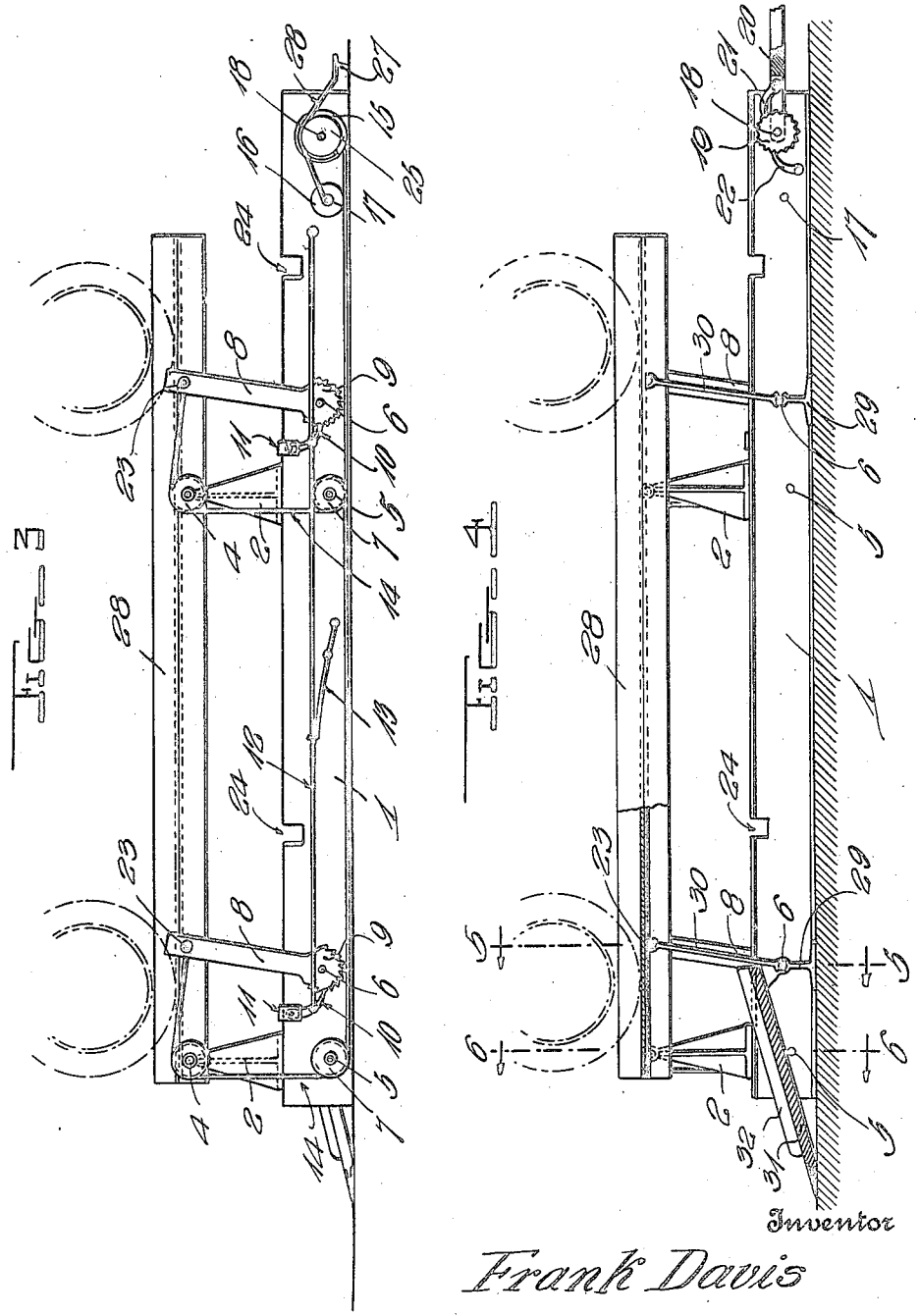

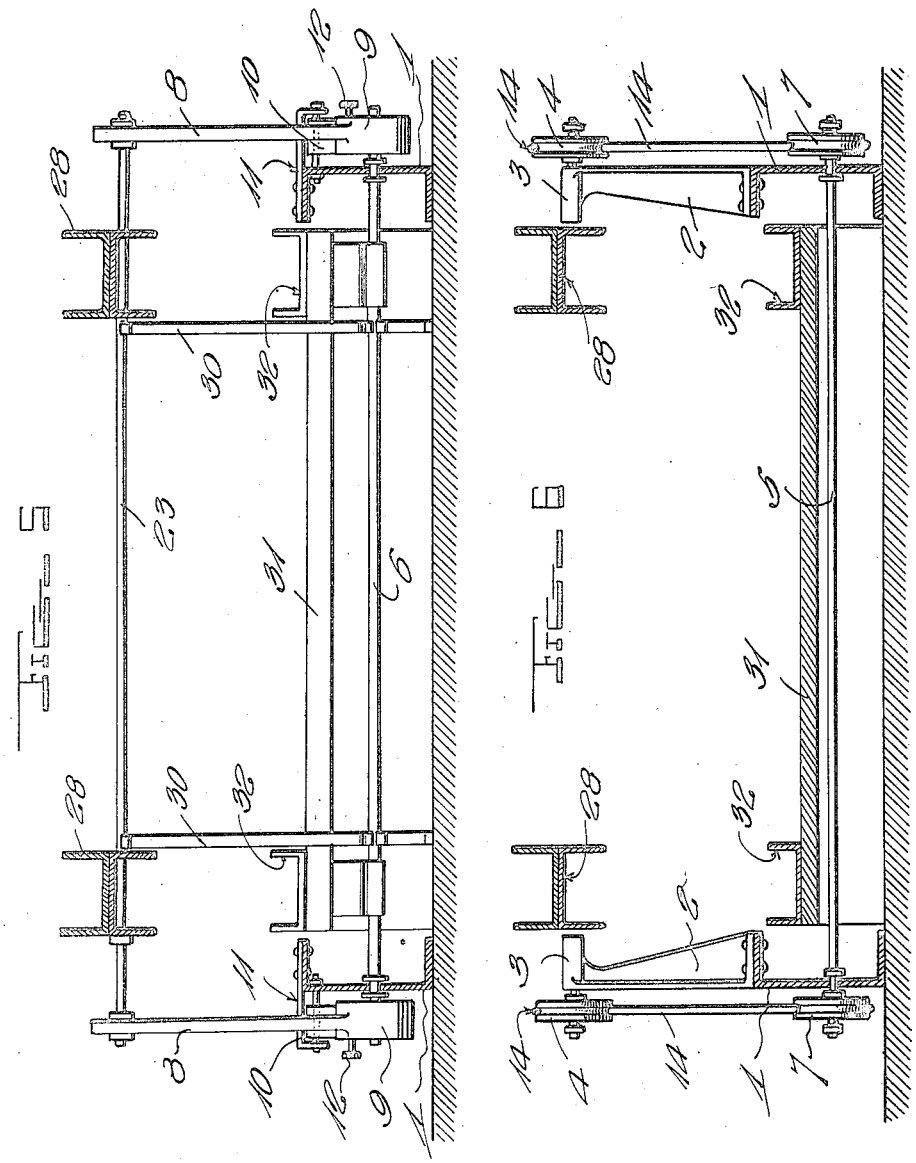

Patented Oct. 17, 1922.

1,432,159

UNITED STATES PATENT OFFICE.

FRANK DAVIS, OF SAN JOSE, CALIFORNIA.

AUTOMOBILE LIFTING FRAME.

Application filed July 5, 1921. Serial No. 482,540.

*To all whom it may concern:*

Be it known that I, FRANK DAVIS, a citizen of the United States, residing at San Jose, in the county of Santa Clara and State of California, have invented certain new and useful Improvements in Automobile Lifting Frames; and I do declare the following to be a full, clear, and exact description of the invention, such as will enable others skilled in the art to which it appertains to make and use the same.

This invention relates to an improved frame or jack for lifting an automobile so that easy access may be had to the mechanism beneath the car.

One object of the invention is to provide a lifting frame of the character described which will be easy to operate and which may be readily swung to a raised position and which may also be easily lowered when desired.

Another object of the invention is to provide a lifting frame having improved bracing means for the portion of the frame which will be swung upwardly in lifting the automobile.

Another object of the invention is to provide a lifting frame so constructed that the automobile may be run onto or off of the frame and further so constructed that there will be no danger of the automobile slipping transversely off of the frame while in a raised position.

Another object of the invention is to provide a lifting frame which will be simple in construction and strong and durable.

This invention is illustrated in the accompanying drawings, wherein:

Figure 1 is a view in side elevation showing the lifting frame in a lowered position and ready to receive the automobile.

Figure 2 is a top plan view of the frame in the lowered position.

Figure 3 is a side elevation showing the frame in the raised position.

Figure 4 is a longitudinal sectional view through the frame in the raised position.

Figure 5 is a transverse sectional view taken along the line 5—5 of Fig. 4.

Figure 6 is a transverse sectional view taken along the line 6—6 of Fig. 4.

This improved lifting frame is provided with a base portion which is provided with side bars 1 formed of heavy angle iron and carrying standards 2 having bearings 3 at their upper ends so that the pulleys 4 may be rotatably carried by these standards. Shafts 5 and 6 are journalled in the side beams 1, the shafts 5 carrying pulley wheels 7 and the shafts 6 having lever arms 8 rigidly mounted thereon and provided with ratchet heads 9 for engagement by pawls 10 pivotally connected with side arms 11 which extend from the side bars 1. These pawls are connected with rods which extend longitudinally of the side bars 1 as shown in Figs. 1 and 2 so that the pawls may be caused to move together and may be simultaneously moved out of engagement with the ratchet heads when pressure is applied to the rods 12 to move the pawls out of engagement with the ratchet heads against the action of the springs 13. Cables 14 are connected with the free end portions of the levers and are passed about the pulley wheels 4 and 7 and carried toward one end of the base where they are wound upon the drums 15 after being brought into engagement with the guide pulleys 16. These pulleys 16 are mounted upon a shaft 17 and the drums 15 are mounted upon a shaft 18 which in addition to carrying the drums, also carries a ratchet wheel 19 and a lever 20. This shaft 18 is the main operating shaft of the lifting frame and when the shaft 18 is rotated by the engagement of the lever pawl 21 with the ratchet wheel 19 and releasably held against rotation in an opposite direction by the pawl 22, the lever arms 8 will be swung upwardly and will carry with them the bars 23 which extend transversely of the frame and will fit into the notches 24 of the side bars 1 when the lever arms are in a lowered position as shown in Fig. 1. A brake drum 25 is mounted upon the shaft 18 and is engaged by a brake 26 which is loosely mounted upon the end portion of the shaft 17 and provided with a treadle extension 27 so that the brake may be brought into binding engagement with the brake drum 25 to prevent the shaft 18 from rotating too rapidly when lowering the automobile.

The wheels of the automobile will rest upon track bars 28 which are formed from eye-beams or from a pair of channel beams secured together. These track beams 28 are mounted upon the shaft 23 which connect the lever arms 8 and it will be readily seen that when the lever arms are swung upwardly, the track beams will also be moved upwardly and thus the automobile will be raised to an elevated position. In order to brace the shafts 23 and 6, there has been provided bracing means in the form of supports 29 positioned beneath the shafts 6 and bracing bars 30 which fit between the bars 6 and 23 and will swing upwardly with the lever arms 8 and thus always remain in the proper position between the shafts 6 and 23 to brace these shafts 23 and prevent them from being bent by the weight of an automobile.

When this device is in use, the automobile will be driven up the gang-plank 31 with the wheels passing through the guides 32. These guides 32 are formed of channel iron and are positioned in alinement with the track beams 28 so that the wheels will be guided onto the track beams. After the automobile is in place, the shaft 18 will be rotated through the medium of the actuating lever 20 and as the shaft rotates, the cables will be wound upon the drums 15 and the lever arms 8 will be swung upwardly thus through the medium of the shafts 23 lifting the track beams 28 and elevating the automobile so that it may be high enough to permit ready access to mechanism beneath the car. After the necessary repairs have been made, the brake 26 may be applied and with the pawls 22 and 21 moved to an inoperative position, the rods 12 may be pressed downwardly to move the pawls 10 out of engagement with the ratchet heads 6 thus releasing the lever arms 8 and permitting the weight of the automobile to swing the arms 8 downwardly and thus lower the automobile to the position where it may be run off of the frame.

A lifting frame has thus been provided which will be easy to operate and which will be strong and durable and of a simple construction.

I claim:—

1. An automobile lifting frame comprising a base including side bars, standards carried by the side bars, pulleys carried by the standards and side bars, a main shaft journalled in the side bars, drums carried by said main shaft, pivotally mounted lever arms having ratchet heads at their pivoted ends, wheel receiving track bars, cross shafts engaging said track bars and connected with said lever arms, cables connected with said lever arms and engaging said pulleys and wound upon said drums, means for rotating said main shaft to wind the cables upon the drums, pawls engaging the ratchet heads of said lever arms, resilient means yieldably holding said pawls in engagement with the ratchet heads, means for simultaneously moving the pawls out of engagement with the ratchet heads, and brake means for controlling rotation of the main shaft while the lever arms are swinging downwardly under the weight of an automobile upon the track bars.

2. An automobile lifting frame comprising a base, lever arms pivotally connected with the base and having their pivoted ends provided with ratchet heads, pawls engaging the ratchet heads and yieldably held in engagement with the same, means for simultaneously moving the pawls out of engagement with the ratchet heads, a main drive shaft carried by the base, drums carried by the main drive shaft, means for rotating the main drive shaft, standards, guide means carried by the base and standards, cables connected with the lever arms and engaging said guide means and wound upon said drums, track bars supported from said lever arms and having movement vertically with respect to the base, and a gang-way carried by the base and provided with wheel guides for guiding the wheels of an automobile onto and off of said track bars.

3. An automobile lifting frame comprising a base portion, track bars, lever arms pivotally connected with the base structure, cross shafts carried by said lever arms and having engagement with the track bars, means for swinging the lever arms upwardly, means for releasably holding the lever arms in a raised position, and bracing means for the cross shafts having engagement with the cross shafts and having swinging movement with the lever arms as the lever arms swing vertically to move the track bars from a lowered to a raised position.

4. A vehicle lifting frame comprising a base structure, shafts journalled in said base, lever arms carried by said shafts, track elements, cross shafts carried by said lever arms and engaging said track elements, supports positioned beneath the first mentioned shafts, bracing bars positioned between and having engagement with the first and second mentioned shafts and having vertical swinging movement with the second mentioned shafts when the lever arms are swung vertically to raise said track elements, and means for swinging the lever arms vertically and retaining the lever arms and track elements in a raised position.

5. A vehicle raising frame comprising a base structure, track elements, means for imparting vertical movement to the track elements including lever arms pivotally connected with the base and cross shafts carried by said lever arms and having engagement with the track elements to support the same, and bracing means for the cross shafts extending parallel to said levers and pivotally mounted at their lower ends and having their upper ends in engagement with the cross shafts, said bracing means having vertical swinging movement with the lever arms as the lever arms swing vertically to elevate the track elements.

In testimony whereof I have hereunto set my hand.

FRANK DAVIS.